United States Patent [19]

Higgins

[11] 4,154,857
[45] May 15, 1979

[54] COLLAGEN DEWATERING WITH POLYSACCHARIDES

[75] Inventor: Thomas E. Higgins, Brookfield, Ill.

[73] Assignee: Union Carbide Corporation, New York, N.Y.

[21] Appl. No.: 780,224

[22] Filed: Mar. 22, 1977

[51] Int. Cl.$^2$ .......................... A23L 11/31; D01F 4/00
[52] U.S. Cl. .................................... 426/278; 106/157; 106/205; 264/202; 426/140
[58] Field of Search ............... 106/126, 129, 157, 205; 426/138, 140, 657, 278; 264/202

[56] References Cited

U.S. PATENT DOCUMENTS

| | | | |
|---|---|---|---|
| 3,494,772 | 2/1970 | Bradshaw et al. | 264/202 |
| 3,523,027 | 8/1970 | Hall | 426/140 |
| 3,806,611 | 4/1974 | Sawada et al. | 264/202 |
| 4,060,081 | 11/1977 | Yannas et al. | 128/156 |

*Primary Examiner*—Lorenzo B. Hayes
*Attorney, Agent, or Firm*—Fred Ian Nathanson

[57] ABSTRACT

In a method for producing formed collagen structures from collagen compositions, the structures are dewatered before the final drying step, by being passed through a bath containing water soluble anionic polysaccharides that are naturally occurring or formed by de-esterification of polysaccharide esters.

Collagen products containing the polysaccharides of this invention are generally obtained by the extrusion of collagen compositions into tubular structures that may be used as casings in the processing of food products such as sausages, frankfurters, and the like.

12 Claims, No Drawings

COLLAGEN DEWATERING WITH POLYSACCHARIDES

This invention relates to a method for producing formed collagen structures and the resultant collagen structures produced thereby and more particularly to an improved method for preparing collagen products such as tubular food casings, wherein the improvement therein lies in the use of certain anionic polysaccharides for dewatering the casings before the final drying step.

Collagen products to which this invention relates are, for example, generally obtained by the extrusion of collagen compositions into tubular structures that may be used as casings in the processing of food products such as sausages, frankfurters, and the like.

In the manufacture of a collagen casing, a continuous length of an extruded, tubular collagenous material is typically conveyed through a series of liquid treatment baths including a plasticizing bath and then dried, such as by air drying, and sized. The dried and sized tubing may then be subsequently shirred and compressed to obtain what is commonly called shirred collagen casing sticks. Typical processes for the production of collagen casing are disclosed in U.S. Pat. No. 3,551,535 issued Dec. 29, 1970 and U.S. Pat. No. 3,782,977 issued Jan. 1, 1974 each to W. E. Henderson et al., and U.S. Pat. No. 3,956,512 issued May 11, 1976 to T. E. Higgins.

In the manufacture of collagen casings, drying of the processed collagen before shirring is an essential step in the process. Drying of the plasticized collagen is expensive, requring a large capital investment in driers such as hot air driers, and drier capacity generally determines maximum production line speed.

In the past, methods other than hot air drying have been used to dewater collagen preparations. Among these are freezing, (U.S. Pat. No. 3,136,682); dialysis and pressure, (U.S. Pat. No. 2,838,363); tanning agents (U.S. Pat. Nos. 3,223,551; 2,750,251 and 2,246,236); and pH adjustment (U.S. Pat. No. 3,223,551). Treatments postulated to remove water by pH adjustment were distilled water extraction (U.S. Pat. No. 2,838,363), ketone or alcohol extraction (U.S. Pat. Nos. 3,622,353; 3,408,916; 2,934,447, and 2,115,648) and buffer salts. Other dehydrating liquids are concentrated salt solutions, such as ammonium sulfate and sodium sulfate (U.S. Pat. Nos. 3,622,353; 3,408,916, and 3,223,551).

The addition of carboxymethylcellulose (CMC) to a liquid treatment bath used in the manufacture of collagen casing is known and is disclosed, for example, in U.S. Pat. No. 3,346,402 to E. R. Lieberman. The CMC serves as a dewatering agent for the collagen casing. Lieberman adds the CMC to a plasticizing bath containing glycerol. Glycerol, as is well known, acts as a humectant and plasticizer which preserves the softness of the casing after drying and helps in maintaining a desired moisture content. The plasticizing material also prevents cracking and other effects consequent upon undue drying. Lieberman adds about 0.33% CMC to the bath containing about 4.8% glycerol, the effect of which is to partially draw out water from the collagen casing.

This invention provides dewatering agents, for the processing of collagen structures such as tubular food casings, which are water soluble anionic polysaccharides that are naturally occurring or formed by de-esterification of polysaccharide esters.

The dewatering agents of this invention reduce the water content of collagen casing entering the hot air driers. Collagen structures treated with dewatering agents in accordance with the present invention have been found to require reduced drier lengths to dry casing at constant line speed, thus reducing capital investment, or have been found to permit an increased production line speed at constant drier length. Use of a dewatering agent also permits, for example, the use of an aqueous coloring agent treatment solution without increasing the time required for drying.

Collagen materials suitable for use in the present invention can be prepared by any one of the methods known in the art as, for example, collagen tissues obtained from a variety of raw materials such as limed and unlimed animal hide splits and tendon.

Suitable dewatering agents in accordance with the practice of the invention are water soluble anionic polysaccharides that are naturally occuring or are formed by de-esterification of polysaccharide esters. De-esterification, catalyzed by an acid, base, or enzyme, splits polysaccharide ester bonds to form the corresponding anionic polysaccharide and an alcohol.

Exemplary suitable dewatering agents are polygalacturonic acid, sodium carrageenan, gum arabic and mixtures thereof.

Other suitable dewaterng agents include, but are not limited to pectic acid, pectin, low methoxyl pectin, sodium polypectate, chondroitin sulfate and the like.

Anionic polysaccharides in which the monomeric units occur in linear chains are the most effective dewatering agents. Nonionic polymers are not markedly effective as dewatering agents. Another structural requirement shared by effective dewatering agents is their polymeric nature and anionic substances only dewater when they are in polymeric form. Linear anionic polysaccharides, uncomplicated by branching, dewater more effectively than the branched anionic polysaccharides such as gums arabic, hatti, karaya and tragacanth.

The dewatering agents of this invention can be used to dewater collagen casing in a dip bath containing the dewatering agent in low concentrations in an aqueous solution or in an aqueous solution also containing a plasticizing agent in low concentrations such as glycerol. Dewatering of the collagen casing is comparable, if either solution is used.

Most practical is a combined plasticizing and dewatering bath. If the dewatering bath were after the plasticizing bath, plasticizer would be leached from the casing. If the plasticizing bath follows the dewatering bath, leaching of dewatering agent from the casing causes a swelling which reverses the dewatering.

Dewatering treatment times should be in the range from about 3 seconds to about 60 minutes, and preferably from about one to about five minutes. A treatment time in the preferred range permits a combined dewatering and plasticizing bath.

The temperature of the dewatering bath should be above the freezing point of the solution, but below 40° C. where thermal degradation of collagen occurs. The temperature should be as low as possible in this range to inhibit microbial spoilage of the dewatering solution, preferably about 25° C. or lower.

The pH of the bath should be in the range where collagen does not swell, about pH 3 to about pH 11, preferably about pH 4 to about pH 10.

The viscosity of the bath should be in the range from about 1 centipoise to about 4000 centipoise and preferably about 1 centipoise to about 10 centipoise. A low viscosity is desired for moving casing through the dip baths more easily.

In the practice of the present invention, the quantity of dewatering agent needed to impart a desired reduction in the moisture content of the collagen structue can vary over a wide range, though small quantities can be used. In general, the amount of dewatering agent incorporated in an aqueous dewatering treatment bath should be at least about 0.01% by weight up to about 20% by weight, and preferably up to about 10% by weight.

Dewatering agents remove water from collagen structures equally well in aqueous solutions or in aqueous solutions containing a polyol plasticizer. If a plasticizer such as glycerol is used in the treatment bath, the concentration thereof should be between about 2% by weight and about 30% by weight and preferably between about 2% by weight and about 10% by weight.

In a preferred embodiment of this invention collagen-containing tissue, as for example, limed animal hide splits, cleaned and prepared by methods well known in the art, are diced or coarsely chopped into pieces about ½ inch to 2 inches in size to facilitate transfer and agitation and then are subjected to treatment with a collagen swelling agent. Any of the known collagen swelling agents may be employed, but it is preferred to use dilute lactic, acetic or hydrochloric acid solutions. Collagen pieces ar treated with swelling agent for an extended period of time, such as, for example 4 to 9 hours or even longer, and, generally, until the character of the collagen material has completely changed from opaque to translucent. The swollen collagenous material is then washed with water to reduce the amount of residual acid, and generally until the pH of the comminuted swollen collagen ranges between about 2.5–3.5. The swollen collagen is then drained, leaving pieces generally referred to as "acid-swollen chips".

As disclosed in U.S. Pat. No. 3,782,977 to Henderson et al, non-collagenous fibers that are to be incorporated into the collagen composition are first formed into a viscous aqueous fibrous dispersion that may contain between about 2% and 10% by weight of the non-collagenous fibers and between about 0.1% and 10% by weight of a viscosity control agent that is preferably water soluble or water dispersible. Suitable viscosity control agents include, for example, methyl cellulose, gelatin, starch, and, particularly, a dispersion of swollen collagen particles. Non-collagenous fibers that may be employed are any of the non-shrinking and essentially inert fibrous additives known to be suitable in collagen compositions such as, for example, wood, cotton, rayon, other cellulosic fibers, non-cellulosic fibers such as polyester, polyamide and the like.

Acid-swollen chips to be used in the preparation of the formable collagen composition are, preferably, further comminuted prior to mixing with the aqueous fibrous dispersion. The acid-swollen chips may be partially subdivided by means known in the art, such as by coarse grinding or crushing, to prepare a mass containing a predominance of chunks having major dimensions of about ⅛ inch to ½ inch.

The viscous fibrous dispersion is vigorously admixed with the acid-swollen collagen chips in a suitable dough mixer or other similar mixing equipment, whereby the fibrous components are uniformly distributed throughout the collagen mass in a relatively short time, as for example, between about 2 and 10 minutes. Towards the end of the mixing step, the collagen mass becomes much more viscous which helps in preventing separation of the various components during forming and subsequent processing thereof.

The collagen composition that is prepared preferably comprises at least about 6% by weight of collagen solids, and has uniformly incorporated therein between about 5% and 30% by weight of non-collagenous fibers based on the weight of the total solids.

It is important that during grinding and mixing of the "acid swollen chips", the temperature of the collagen mass be kept low and the temperature of the mass is, in general, maintained below about 25° C.

The uniform high collagen solids composition so prepared is suitable, with only limited further processing, for forming into commercially acceptable formed or extruded collagen structures. A screw extruder or similar device can be used to transfer the collagen composition to homogenization equipment used in final preparation of the composition for extrusion.

The collagen composition is extruded to form a continuous tube of collagen, which tube is strong enough to support itself in a tubular configuration with a low pressure inflation air while being conveyed to and through a predryer. The tubing is then collapsed between nip rolls, neutralized by passing through a dip tank containing very dilute ammonium hydroxide, washed by passing through water tanks, and then plasticized by being conveyed through a dilute glycerol solution. In accordance with the practice of the invention, the plasticization bath has incorporated therein a dewatering agent of the present invention in an amount as herein described.

It has been found that wherein collagen tubing that has been conveyed through a glycerol plasticizer bath will generally have a moisture content of between about 75% by weight to about 85% by weight, the water content of collagen tubing conveyed through a plasticizer bath containing a dewatering agent in accordance with the practice of the present invention will have a significantly lower moisture content generally between about 55% to 67%. The collagen tubing is then reinflated with low pressure air, conveyed through a hot air drier while maintaining the tubular configuration, and then, if desired, shirred into a shirred casing stick using methods well known in the art.

Any shaped collagen article such as spheres, rods, tubes and the like can be prepared using dewatering agents of this invention. The thickness of the article, such as the tubular casing wall, is not a critical variable in the practice of the invention.

Collagen tubing prepared in accordance with the present invention performs satisfactorily during shirring, stuffing, linking and cooking operation.

Collagen structures, such as tubular food casings, of the present invention have the polysaccharide dewatering agent uniformly incorporated therein in an amount of at least about 0.04% by weight up to about 36% by weight and preferably up to about 23% by weight of all components in said casing.

The following examples are set forth as illustrating embodiments of the present invention and are not intended in any way to indicate the limits of the invention. Parts and percentages, unless otherwise indicated, are by weight. The term "wt%" as employed herein is intended to refer to weight percent.

In the examples which follow, dewatering was measured by weighing the collagen article before and after treatment with the dewatering agents. A "dewatering index" is used to rank dewatering efficiency and is defined as 100 times the collagen article weight after treatment divided by the weight before treatment. A low value for the "dewatering index" indicates effective dewatering, a "dewatering index" of 100 indicates no dewatering, and an "index" greater than 100 indicates swelling rather than dewatering.

EXAMPLE I

This example illustrates a method of manufacturing collagen casing wherein a dewatering treatment using polygalacturonic acid as the dewatering agent is employed. 2114 pounds of limed beef hide splits are chopped into approximately ½" to 2" pieces and subjected to an additional lime treatment by charging into a tank together with 150 pounds of lime and sufficient water to give a water to hide ratio of 2.8 to 1. The lime treatment is continued for 56 hours with intermittent agitation after which the limed hide chips are leached with approximately 10 gallons per minute of water for 8 hours. The hide chips are then swollen for 14 hours in a hydrochloric acid solution maintained at a pH of 1 using a flow rate of dilute acid of 10 gals/min. At the end of the acid swell treatment, the swollen chips are washed with water at 10 gal/min for about 4 hours until a wash water pH of 2.4 is reached. The chips are drained and chilled to about 1° C.

A cellulose fiber dispersion is prepared using the following ingredients:

| Ground Acid-Swollen Corium | 229 pounds |
|---|---|
| Wood Cellulose Fibers | 191 pounds |
| Water | 1979 pounds |
| Ice | 800 pounds |
| Concentrated Hydrochloric Acid 20° Baume | 1 pound |

The wood cellulose fibers have an average fiber length of about 0.04". Sheets of fibers are separated into convenient pieces, soaked in a portion of the water for about 60 minutes and then mixed for about two minutes, soaked for an additional 30 minutes, and then mixed for about two minutes. The rest of the ingredients are added to the mixer and the mixture is blended for about 170 minutes. The resulting wood cellulose fiber suspension is smooth, highly viscous, free of fiber clumps and has a composition of hide solids 1%, wood cellulose fibers 5.6% and water 93.4%.

A 1435 pound collagen composition having a total solids of 10.8% is prepared having the following solids composition:

| Ground hide | 80% |
|---|---|
| Wood Cellulose Fibers | 20% |

The collagen composition was prepared by weighing 869 pounds of ground acid-swollen chips containing 13.6% solids, 542 pounds of cellulose fiber dispersion, and 24 pounds of water.

Acid-swollen chips are prepared as described above are ground in a meat grinder into pieces substantially between about ⅛" and ½" in size prior to blending with the viscous cellulose fiber dispersion. The temperature during grinding of the chips is controlled so as not to exceed about 20° C.

Cellulose fiber dispersion, water, and ground acid-swollen chips are mixed for about five minutes at which time the composition is homogeneous and begins to adhere to the mixing equipment. The temperature of the various materials during the mixing step is controlled so as not to exceed 20° C.

After preparing the collagen composition, it is fed through a rotary-shear homogenizer by means of a screw extruder and pump. To prevent degradation of the collagen, the homogenizer rotor and stator are cooled with a coolant maintained at a temperature about −5° C.

After homogenization, the blend is pumped through two parallel filters with 0.003" slots to break up any remaining collagen lumps and remove any nondispersed matter.

The filtered collagen blends are pumped and metered through an extrusion nozzle to form a continuous tube of collagen. The extruded tubes are inflated with low-pressure inflation air while being conveyed on horizontal rolls.

The inflated collagen tubing is partially dried and hardened by passing through a predryer at 50° C., then collapsed between nip rolls, neutralized by passing through a dip tank containing 0.06 N ammonium hydroxide and washed by being conveyed through water tanks. After washing, the collapsed collagen tubing is conveyed through a solution of 4.4% glycerol and water which contains 1% polygalacturonic acid and sufficient sodium hydroxide to give a pH of 8.0. The contact time with polygalacturonic acid solution is 2.1 minutes.

The tubing samples are then reinflated with low pressure air, dried in air at 100° C., moisturized and then shirred.

Prior to reinflating and drying the tubing, samples of the collapsed tubing are collected and weighed. The results are shown in Table 1. After treatment with polygalacturonic acid, the weight of the collapsed tubing is less than that of collapsed tubing which is conveyed through a glycerol and water solution, not containing the polygalacturonic dewatering agent.

The results show that polygalacturonic acid treatment removes water from collagen tubing.

Table 1

| Casing Sample | Polygalacturonic Acid in Dewatering Treatment Both (pH 8.0) (wt.%) | Weight of Collapsed Tubing (Grams) | | Dewatering Index [100 X Treated Weight divided by Untreated Weight] |
|---|---|---|---|---|
| | | Before Treatment | After Treatment | |
| A | 0 | 10.28 | 10.02 | 97 |
| B | 1.0 | 9.92 | 8.08 | 81 |
| C | 2.0 | 10.64 | 8.80 | 83 |

EXAMPLE II

This example illustrates the effectiveness of various linear anionic polysaccharides as dewatering agents.

Collapsed collagen tubing prepared in a manner similar to that of Example I is collected after the washing step. This collapsed tubing is stored frozen or refrigerated and is used is a series of experiments. These experiments show that treatment with low concentrations of linear chain anionic polysaccharides removes water from collapsed collagen tubing.

In the conduct of the series of experiments, a piece of collapsed tubing weighing about 10 grams is blotted thoroughly with a cloth towel to remove surface water and is weighed to the nearest 0.01 grams. The blotted collapsed collagen tubing is then treated for five minutes with agitation in an aqueous dip bath containing linear anionic polysaccharides at various concentrations. The treated, collapsed collagen tubing is blotted and weighed. From the two weights a dewatering index is calculated wherein the dewatering index equals 100 times the weight after treatment divided by the weight before treatment. The lower the dewatering index, the more effective is the dewatering. Table 2 summarizes the results of these dewatering experiments.

Table 2

| Dewatering Agent | | Dewatering Index at Indicated Concentration (wt%) | |
|---|---|---|---|
| Class | Substance | 0.5 | 1.0 |
| Pectic Substances | Pectic Acid | (a) | 60 |
| | Polygalacturonic Acid | 70 | 62 |
| | Citrus Pectin | 91 | 86 |
| | Low Methoxyl Pectin (Sunkist Inc 3466u) | 75 | 82 |
| | Sodium Polypectate | 86 | 77 |
| Miscellaneous | Sodium Carrageenan (Marine Colloids Inc Viscarin SIM) | 87 | 78 |
| | Carboxymethyl Cellulose (Hercules Inc 7LF) | 89 | 77 |
| | Chondroitin Sulfate | (a) | 83 |

(a) not determined

EXAMPLE III

This example illustrates the dewatering of collagen tubing by agents which are slightly less effective at low concentrations than those disclosed in the prior example.

Collapsed collagen tubing is collected, stored and treated as described in Example II using additional dewatering agents. The results are shown in Table 3.

Table 3

| Dewatering Agent | Concentration (wt %) | Dewatering Index |
|---|---|---|
| High Mannuronic Acid Propylene Glycol Alginate (Marine Colloids Inc LF/5) | 1.0 | 91 |
| Gum Arabic | 1.0 | 91 |
| Carboxymethyl-hydroxyethyl-cellulose (Hercules Inc CMHEC 43L) | 1.0 | 92 |
| Low Mannuronic Acid Propylene Glycol Alginate (Kelco Inc Kelcoloid S) | 2.5 | 92 |

EXAMPLE IV

This example illustrates the effect of the concentration of the dewatering agent on the dewatering index.

Collapsed collagen tubing is collected, stored and treated as described in Example II at various dewatering agent concentrations. The results which are shown in Table 4 indicate that dewatering increased with increasing concentration of the dewatering agents.

Table 4

| Dip Bath Dewatering Agent Concentration (wt %) | Dewatering Index | | | |
|---|---|---|---|---|
| | Polygalacturonic Acid | Sodium Carrageenan | Gum Arabic | High Mannuronic Acid Propylene Glycol Alginate |
| 0 | — | 101 | 101 | — |
| 0.1 | 95 | — | — | — |
| 0.3 | 78 | — | — | — |
| 0.5 | 70 | 87 | — | 98 |
| 0.7 | 65 | — | — | — |
| 0.9 | 61 | — | — | — |
| 1 | 62 | 78 | 91 | 91 |
| 1.5 | — | 72 | — | — |
| 2 | — | 71 | — | 75 |
| 3 | 57 | 68 | 79 | 66 |
| 5 | 51 | — | 71 | — |
| 7 | 50 | — | 64 | — |
| 10 | 45 | — | 58 | — |
| 12 | 45 | — | — | — |

EXAMPLE V

This example is presented to show that the dewatering agents of the present invention are as effective in an aqeuous glycerol solution as they are in an aqueous solution without any plasticizer such as glycerol and that in a dilute aqueous glycerol solution the dewatering agents of the present invention are performng the actual dewatering and not the glycerol. Specifically, Table 5 shows that glycerol in a dilute solution has no significant effect on dewatering by polygalacturonic acid. The collapsed collagen tubing used in this example is prepared in a manner similar to that of Example I and is collected after the washing step disclosed in that example.

Separate tubing samples are treated for one minute with each solution.

Table 5

| Solution Concentration (wt %) | | Dewatering Index |
|---|---|---|
| Glycerol | Polygalacturonic Acid | |
| 5.0 | 1.0 | 71 |
| 5.0 | 0.0 | 96 |
| 0.0 | 1.0 | 73 |
| 0.0 | 0.0 | 95 |

EXAMPLE VI

This example illustrates that the dewatering agents of this invention should be in polymeric form. In this example a polygalacturonic acid dewatering solution at pH 8 dewaters effectively whereas galacturonic acid monomer does not dewater.

Collapsed collagen tubing is collected, stored, and treated in aqueous dip baths as described in Example II with polygalacturonic acid and with galacturonic acid monomer in aqueous solutios at pH 8. The results which are shown in Table 6 show dewatering by polygalacturonic acid and no dewatering by galacturonic acid monomer.

Table 6

| Solution Concentration (wt %) | | Dewatering Index |
|---|---|---|
| Polygalacturonic Acid | Galacturonic Acid | |
| 0 | 0 | 100 |
| 0 | 1.0 | 103 |
| 0 | 5.0 | 128 |
| 1.0 | 0 | 62 |

Table 6-continued

| Solution Concentration (wt %) | | |
| --- | --- | --- |
| Polygalacturonic Acid | Galacturonic Acid | Dewatering Index |
| 5.0 | 0 | 51 |

EXAMPLE VII

This example illustrates that in order for effective dewatering to occur contact with the dewatering agent should be in the last aqueous treatment bath, prior to the final hot air drying step.

Collapsed collagen tubing is collected, stored, and treated in aqueous dip baths as described in Example II except that in one experiment (A) an aqueous dewatering bath (pH 7.4) is used prior to a final aqueous glycerol bath not containing any dewatering agent and in experiments B and C the dewatering agent is solely contained in the final aqueous glycerol bath (pH 7.4). Dewatering results for these two experiments, wherein polygalacturonic acid is used as the dewatering agent, are shown in Table 7. With respect to the two bath treatment (Experiment A), the dewatering index is computed by dividing the weight of the collagen tubing after treatment in the last bath by the weight of the collagen tubing prior to treatment in the next to last bath and multiplying the result by 100. The dewatering indices of experiments B and C are computed by weighing the collagen tubing after treatment in the last bath and dividing that weight by the tubing weight prior to treatment in the last bath and multiplying the result by 100.

The results show that the dewatering agent should be included in the final bath for effective dewatering to occur.

Table 7

| | Dip Bath Concentration (wt%) | | | |
| --- | --- | --- | --- | --- |
| | Next to Last Bath Polygalacturonic Acid | Last Bath | | |
| | | Glycerol | Polygalacturonic Acid | Dewatering Index |
| Experiment A | 1.0 | 5.0 | 0 | 92 |
| Experiment B | * | 0 | 1.0 | 75 |
| Experiment C | * | 5.0 | 1.0 | 73 |

* No dewatering bath prior to last bath

Although the present invention has been set forth with particularity and described in some detail, it should be understood that changes, modifications and alterations can be made therein without departing from the scope of the invention.

What is claimed is:

1. In a method of producing a shaped collagen article, the improvement consisting essentially of the steps of: (1) dewatering the shaped collgen article prior to the final drying step, by immersing said shaped collagen article in an aqueous dewatering bath comprising at least about 0.01% by weight of said bath of a water soluble anionic polysaccharide that is naturally occurring or formed by de-esterification of polysaccharide esters selected from the group consisting of polygalacturonic acid, sodium carrageenan, gum arabic, pectic acid, pectin, low methoxyl pectin, sodium polypectate, and chondroitin sulfate and (2) subjecting said collagen article to final drying.

2. The method of claim 1 wherein the shaped collagen article is a tubular food casing.

3. The method of claim 1 wherein said aqueous dewatering bath comprises up to about 20% by weight of said polysaccharide.

4. The method of claim 1 wherein said aqueous dewatering bath additionally comprises glycerol.

5. The method of claim 1 wherein said polysaccharide comprises polygalacturonic acid.

6. The method of claim 1 wherein said polysaccharide comprises sodium carrageenan.

7. The method of claim 1 wherein said polysaccharide comprises gum arabic.

8. The method of claim 1 wherein said polysaccharide comprises pectic acid.

9. The method of claim 1 wherein said polysaccharide comprises pectin.

10. The method of claim 1 wherein said polysaccharide comprises low methoxyl pectin.

11. The method of claim 1 wherein said polysaccharide comprises sodium polypectate.

12. The method of claim 1 wherein said polysaccharide comprises chondroitin sulfate.

* * * * *